(12) United States Patent
Muhamad et al.

(10) Patent No.: US 11,047,363 B2
(45) Date of Patent: Jun. 29, 2021

(54) MAIN FRAME FOR A WIND TURBINE

(71) Applicant: Nordex Energy SE & Co. KG, Hamburg (DE)

(72) Inventors: Ibrahim Muhamad, Rostock (DE); Nils Toenissen, Rostock (DE); Torsten Wackrow, Rostock (DE)

(73) Assignee: Nordex Energy SE & Co. KG, Hamburg (DE)

(*) Notice: Subject to any disclaimer, the term of this patent is extended or adjusted under 35 U.S.C. 154(b) by 235 days.

(21) Appl. No.: 16/352,650

(22) Filed: Mar. 13, 2019

(65) Prior Publication Data
US 2019/0285056 A1 Sep. 19, 2019

(30) Foreign Application Priority Data
Mar. 13, 2018 (EP) .................................. 18161416

(51) Int. Cl.
*F03D 13/20* (2016.01)
*F03D 80/80* (2016.01)

(52) U.S. Cl.
CPC ............. *F03D 13/20* (2016.05); *F03D 80/80* (2016.05); *F03D 80/88* (2016.05); *F05B 2240/14* (2013.01); *F05B 2240/912* (2013.01); *Y02E 10/72* (2013.01); *Y02E 10/728* (2013.01)

(58) Field of Classification Search
CPC .......... F03D 13/20; F03D 13/10; F03D 13/25; F03D 13/35; F03D 13/22; F03D 80/80; F03D 80/88; F05B 2240/14; F05B 2240/912; F05B 2240/913

USPC ...................... 415/213.1, 4.1–4.3; 290/44, 55
See application file for complete search history.

(56) References Cited

U.S. PATENT DOCUMENTS

| 8,183,710 B2* | 5/2012 | Segovia ................. F03D 80/00 290/55 |
| 9,103,326 B2 | 8/2015 | Emo et al. |
| 2012/0025538 A1 | 2/2012 | Luneau et al. |
| 2012/0205915 A1 | 8/2012 | Liingaard et al. |

(Continued)

FOREIGN PATENT DOCUMENTS

| EP | 2693048 A2 | 2/2014 |
| EP | 2740928 A1 | 6/2014 |

(Continued)

*Primary Examiner* — Mark A Laurenzi
*Assistant Examiner* — Mickey H France
(74) *Attorney, Agent, or Firm* — Walter Ottesen, P.A.

(57) ABSTRACT

The disclosure relates to a support structure of a wind turbine, in particular a main frame. An object is to develop an ideal load distribution and stiffness distribution of the main frame with a least possible use of material. The main frame is intended optimally to fulfill the requirements with respect to the operating and extreme loads and the stiffness for the given space conditions inside the nacelle. The main frame has a top, bottom, front and rear side, and includes a circumferential annular wall between the bottom and the top side. The main frame includes two lateral portions of the wall that extend between the front side and the rear side of the main frame. Additionally included are two lateral flanges on the top side of the main frame, a plurality of arms being arranged inside the wall. The arms are connected to the wall via a box profile.

16 Claims, 7 Drawing Sheets

(56) References Cited

U.S. PATENT DOCUMENTS

2014/0010664 A1* 1/2014 Markussen ........... F16C 35/047
416/244 R
2019/0136837 A1* 5/2019 Christiansen ........... F03D 13/10

FOREIGN PATENT DOCUMENTS

| EP | 2740932 A1 | 6/2014 |
|----|------------|--------|
| WO | 2018037276 A1 | 3/2018 |

* cited by examiner

MAIN FRAME FOR A WIND TURBINE

CROSS REFERENCE TO RELATED APPLICATION

This application claims priority of European patent application no. 18 161 416.5, filed Mar. 13, 2018, the entire content of which is incorporated herein by reference.

FIELD OF THE INVENTION

The invention relates to a support structure of a wind turbine, in particular a main frame for the wind turbine.

BACKGROUND OF THE INVENTION

A wind turbine usually includes a tower and a nacelle that is mounted on the tower head so as to be rotatable about the longitudinal axis of the tower. The nacelle carries the rotor, having a rotor hub, and at least one rotor blade, as well as a generator, which converts the energy that is extracted from the wind by the rotor into electrical energy.

The nacelle of a wind turbine includes a support structure, and a non-load-bearing nacelle cover having a framework consisting of struts and profiles. Inside the nacelle, there are various system components arranged on the support structure. The support structure usually includes a main frame of cast metal, and a generator frame, as a welded construction. The nacelle cover protects the components inside the nacelle against external environmental influences. For wind turbines and their operating conditions, the stability of the nacelle is of particular importance. In particular, subject matter of the disclosure is the part of the nacelle that is realized as a main frame.

Since the main frame generally is made of a metal casting, and is not composed of individual parts, when a wind turbine is newly developed the contour and the necessary stiffening of the main frame are newly calculated and developed according to the operating and extreme loads. Furthermore, the configuration of the main frame depends on necessary holding and receiving functions such as, for example, the carrying of the drivetrain. A further important point of the configuration of the main frame is the necessary stiffness that must be provided by the main frame in order to prevent, for example, an excessive deflection of the drivetrain.

U.S. Pat. No. 9,103,326 discloses a main frame having a support frame, a cross structure being arranged, beneath the rotor shaft, in the support frame. The cross structure includes one or more arms.

US 2012/205915 A1 describes a wind turbine that includes a machine frame. The rotor shaft is carried by a base of the machine frame, in order to ensure greater stiffness and safety during operation. The wind turbine additionally includes a stiffening element, which stiffens the base and extends from the base over the rotor shaft, in order at least partly to cover an upper part of the rotor shaft.

Both EP 2740928 A1 and EP 2740932 A1 describe a main frame that shows through-holes in the mainframe. The through-holes allow access to the interior of the main frame without significantly weakening its stiffness. To enable better absorption of applied forces, the main frame is not realized as a platform, but has an approximately closed structure, having the individual through-holes.

WO 2018/037276 A1 discloses a self-supporting nacelle structure for wind turbines that includes a tubular outer metal shell. An inner metal frame is fastened to the shell, and has a multiplicity of transverse ribs, and a multiplicity of longitudinal ribs for connecting the transverse ribs to each other.

SUMMARY OF THE INVENTION

It is an object of the invention to develop an ideal load distribution and stiffness distribution of the main frame with a least possible use of material. The main frame is intended optimally to fulfil the requirements with respect to the operating and extreme loads and the stiffness for the given space conditions inside the nacelle.

The object can, for example, be achieved via a main frame for a wind turbine having a top side, a bottom side, a front side and a rear side. The main frame includes a circumferential annular wall between the bottom side and the top side. The main frame additionally includes two lateral portions of the wall that extend between the front side and the rear side of the mainframe. Additionally included are two lateral flanges on the top side of the mainframe, a plurality of arms being arranged inside the wall. The arms are connected to the wall via a box profile.

At least four arms are arranged, two arms being connected, as a symmetrical pair, on the rear side of the main frame, at an angle V with the box profile and the wall, for example at the lateral portions, and respectively two arms being connected, as a symmetrical pair, on the front side of the main frame, at an angle U with the box profile and the wall.

In an embodiment, the arms end directly at the front side of the wall, or the arms are extended beyond the wall and end at the flanges.

In a further embodiment, the arms each have a collar that is formed onto the arms inwardly, outwardly or on both sides, on the top side or bottom side.

In a further embodiment, the angle V and the angle U between the arms depend on the length and width of the main frame.

In a further embodiment, the box profile is arranged in a centered manner in relation to the main frame, preferably in the center thereof.

The box profile has a rectangular or trapezoidal shape, the trapezium being able to be realized such that it tapers towards the rear side or towards the front side of the main frame.

In an embodiment of the box profile, it is realized as an open or closed construction, and has two limbs, of equal length, that are connected to a basic side at their first end that faces towards the rear side of the main frame, and to a basic side at their second end that faces towards the front side of the mainframe. The limbs and the basic sides are each of a length that is adapted to the main frame with respect to load bearing and stiffness, width and length.

In a further embodiment, the basic sides are equal in length, or in each case one of the basic sides is shorter than the other.

In a further embodiment, the box profile has further interior sub-divisions between the limbs and the basic sides, due to transversely and/or longitudinally extending walls.

In an embodiment, the bottom side of the main frame has a circular, partly closed, contour that is curved spherically in the direction of the top side.

In a further embodiment, on the front side and rear side, respectively, there is an elliptical cutout made in the top side of the annular wall.

In a further embodiment, the top side of the main frame is provided with a concave curvature in the longitudinal direction, the curvature determining the configuration both of the box profile and of the arms, with their formed-on collars.

The main frame may be produced via welding or casting.

An advantage of the invention is that the choice of production method is dissociated from the ideal configuration. The described configuration may be realized both as a cast part as via a welded construction.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
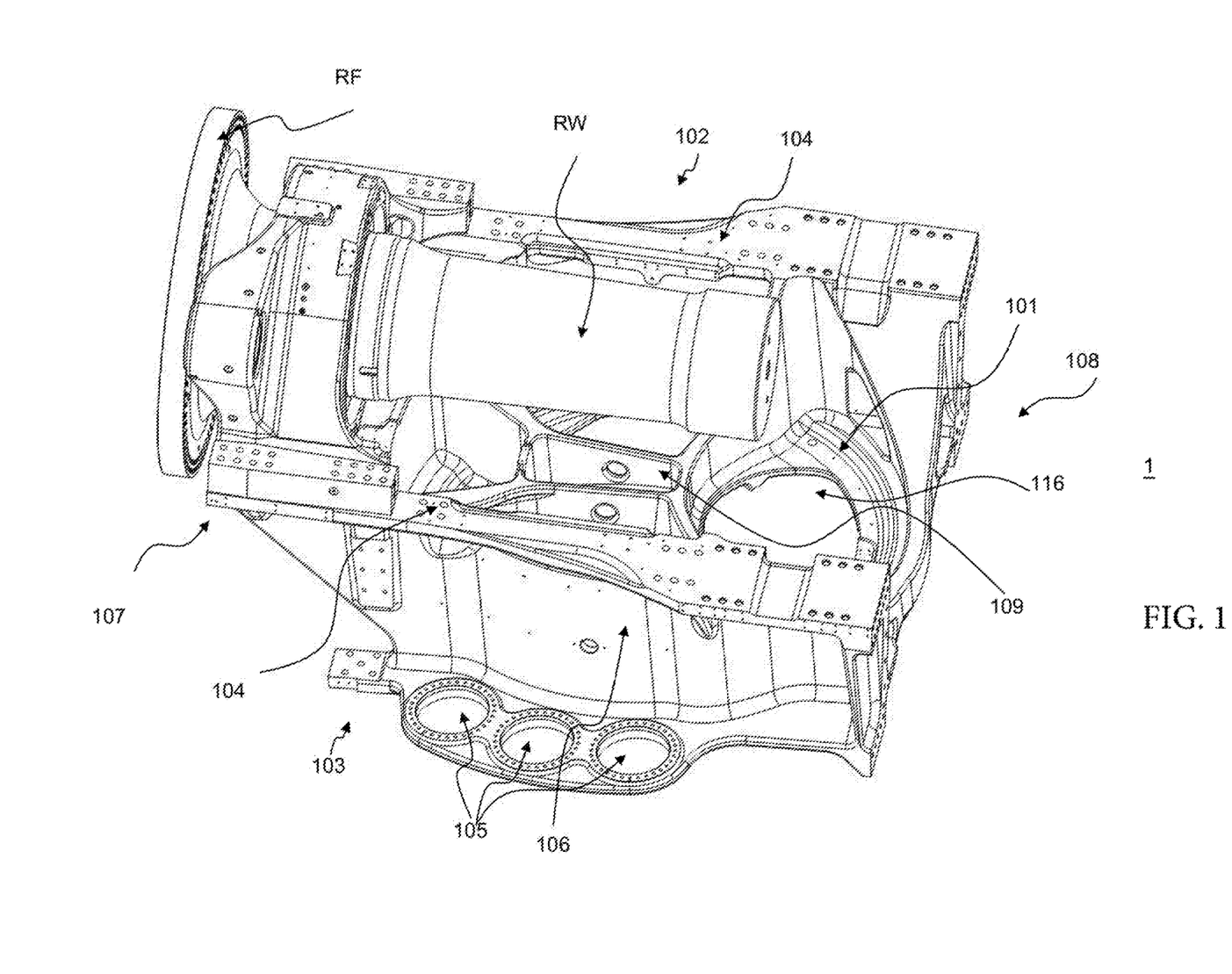
FIG. 1 shows a main frame with a rotor shaft and a gearbox.

Shown in FIG. 1 is a perspective view of the main frame 1 of a wind turbine, with a rotor shaft RW and openings 105 for yaw drives. The rotor shaft RW is mounted on the main frame 1. On the front side 107, the rotor shaft RW has a rotor flange RF, which may be connected to a rotor hub (not represented).

The main frame 1 basically has a trough-shaped structure, having a top side 102, a bottom side 103, a front side 107 and a rear side 108. The front side 107 and the rear side 108 lie in the direction of the axis of the rotor shaft RW, the front side 107 facing in the direction of the rotor hub (not represented), and the rear side 108 in the direction of the generator frame (not represented). On the bottom side 103, the main frame 1 has a circular, partly closed, structure, that is additionally curved spherically upwards. Formed onto the bottom side 103 is a circumferential annular wall 101 that faces towards the top side 102. On the front side 107 and on the rear side 108, respectively, of the main frame 1, the wall 101 is provided with an elliptical cutout. The wall 101 in each case extends laterally from the elliptical cutouts toward the top side 102, these portions of the wall 101 to be referred to in the following as lateral portions 106. On the top side 102, the lateral portions 106 are provided with flanges 104 that extend between the front side 107 and the rear side 108, along the main frame 1, towards the bottom side 103. The flanges 104 serve as support surfaces for a rotor bearing housing (not represented) and the gearbox support (not represented). Arranged on the bottom side 103 of the main frame 1, directed outwardly on both sides, beneath the flanges 104, are round openings 105 that serve to receive the yaw drives (not represented), one yaw drive being mounted in each opening 105.

Figure 2:
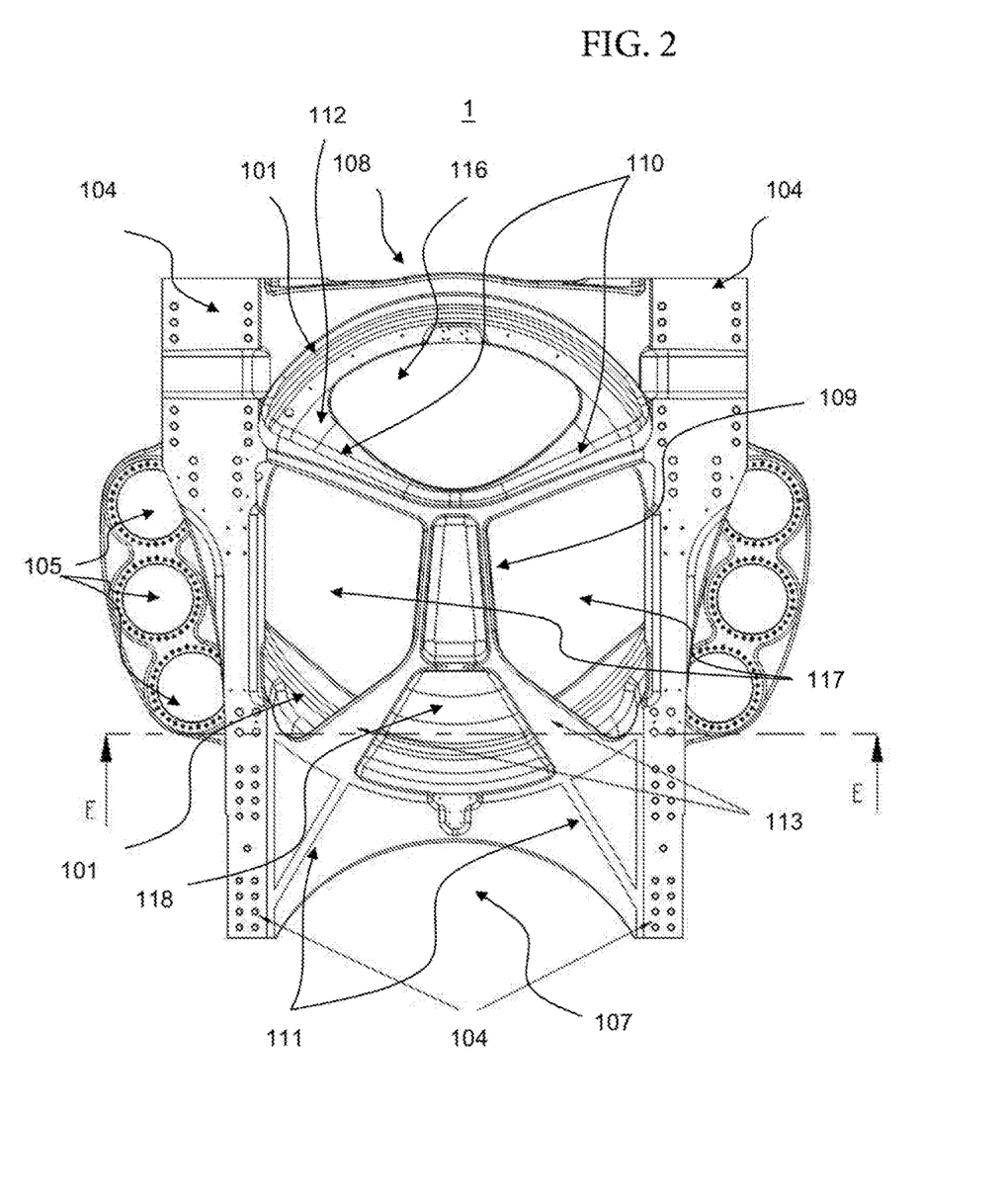
FIG. 2 shows the main frame in a top view.

FIG. 2 shows the main frame 1 in a top view. Visible in the figure are the main frame 1, the round openings 105, arranged on both sides on the bottom side 103 of the main frame 1, for the yaw drives, and the substantially parallel flanges 104 arranged, on both sides, on the top side 102. In the present embodiment according to FIG. 2, three openings 105 can be seen in each case. The number of openings 105 depends on the dimensioning of the yaw drive system and the resultant number of yaw drives.

Arranged in the middle of the main frame 1, approximately in its center 10, is a trapezoidal or rectangular box profile 109, which is open upwardly or downwardly. It is not essential for the box profile 109 to be located in the center 10 of the main frame 1. The box profile 109 may be arranged both inside and outside of the center 10 of the main frame 1. The box profile 109 is located beneath the rotor shaft RW. The box profile 109 may vary in its limb length (W, X, Y) according to need with respect to loads and stiffness, width and length of the main frame 1. According to need, therefore, the box profile 109 is rectangular, or trapezoidal, tapering towards the front side 107 or towards the rear side 108.

Four arms 110 and 111, each starting from a corner of the box profile 109, connect the box profile 109 to the wall 101 of the main frame 1. The arms 110, 111 are not directly connected to each other. Two arms 110 and 111 in each case are realized as a symmetrical pair. The arms 110 are arranged directed towards the rear side 108 of the main frame 1, and extend at an angle V, starting from the box profile 109, into the rear lateral portions 106 of the wall 101. The angle V varies according to the length and width of the main frame 1. The arms 111, likewise realized as a symmetrical pair, are connected to the wall 101 in the region of the front side 107 of the main frame 1, and extend, at an optimized angle U, starting from the box profile 109, to the wall 101 of the front side 107. In the present embodiment, the arms 111 are extended beyond the wall 101 of the front side 107, and end at the flanges 104 of the rotor bearing housing, whereby the flanges 104 are additionally supported. In the case of a smaller main frame 1 or shorter flanges 104, the arms 111 may also end directly at the wall 101 of the front side 107. Since the box profile 109 is located beneath the rotor shaft RW, and the arms 110, 111 are connected to the wall 101, the shape of the arms 110, 111 follows the contour of the rotor shaft RW, such that the arms 110, 111 have a rounded recess.

As can also be seen from FIG. 2, formed onto each of the arms 111 there is a collar 113, which is spread outwards. It can also be seen that the arms 110 each have a collar 112, which extends inwards. These formed-on collars 112, 113 may be formed onto the arms 110, 111 on the inside, outside or both sides, directed towards the top side 102 or towards the bottom side 103 of the main frame 1. The arms 110, 111 may also be realized entirely without a collar 112, 113. The maximal variant thus consists in that all arms 110, 111 are realized with a collar 112, 113 on both sides, directed both towards the top side 102 and towards the bottom side 103 of the main frame 1.

Figure 3:
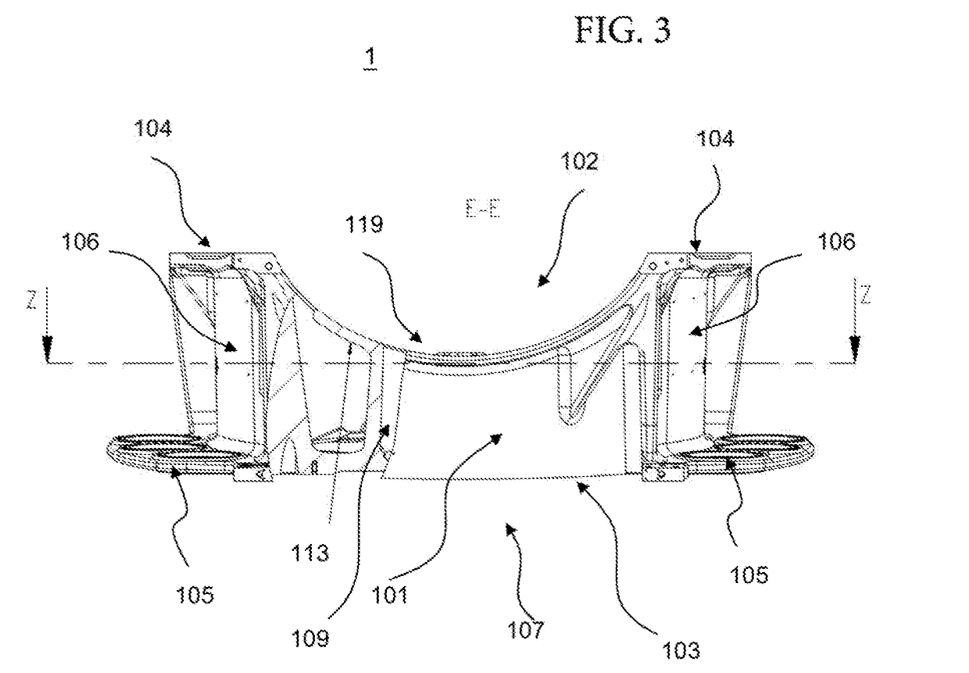
FIG. 3 shows a partial section E-E through the main frame from FIG. 2.

Represented in FIG. 3 is a partial section E-E through the main frame 1 from FIG. 2. The partial section E-E goes through the arms 111 on the front side 107 of the main frame 1, the wall, 101, the arms 111 with their formed-on collar 113, the flanges 104, the lateral portions 106 and the openings 105 for the yaw drives being visible. It is additionally clear from FIG. 3 that the top side 102 of the main frame 1 is provided with a concave curvature 119 in the direction of the axis of the rotor shaft RW, the curvature 119 determining the configuration both of the box profile 109 and of the arms 110, 111 with their formed-on collars 112, 113.

Figure 4:
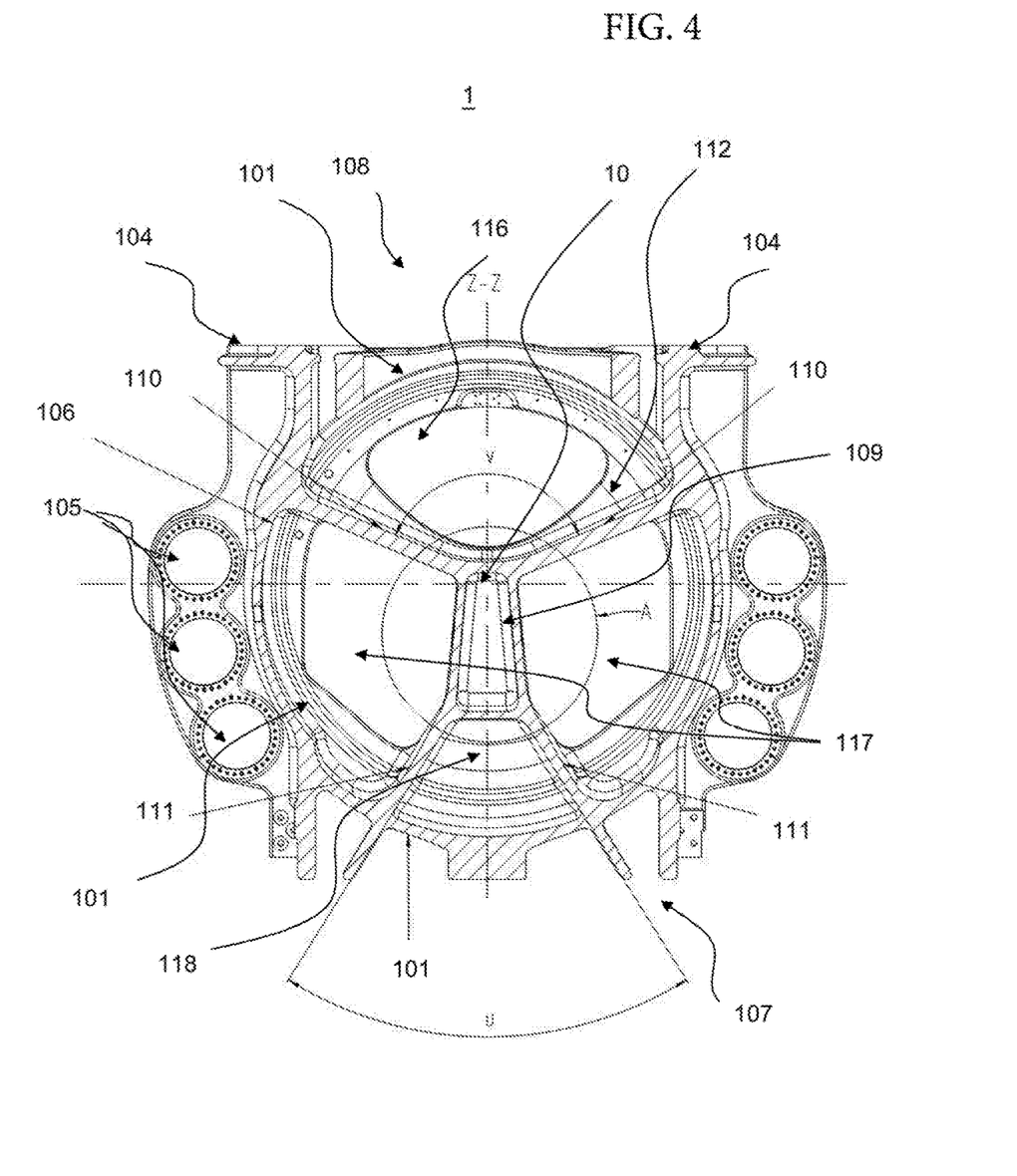
FIG. 4 shows a section Z-Z through the main frame from FIG. 3.

FIG. 4 shows a section Z-Z through the main frame 1 from FIG. 3, drawn at the level of the box profile 109. It shows the wall 101, the arms 110, 111, the box profile 109 arranged in the center, and the openings 105 for the yaw drives. It can be seen clearly in FIG. 4 that the arms 110 end in the lateral portions 106. By contrast, the arms 111 do not end in the lateral portions 106, but are extended, on the front side 107 of the main frame 1, beyond the wall 101. The angle V between the arms 110 at the rear side 108 of the main frame 1 varies according to the length and width of the main frame 1. The optimized angle U between the arms 111 on the front side 107 of the main frame 1 likewise depends on the length and width of the main frame 1, and on where the arms 111 are connected, at the flanges 104 or directly at the wall 101 of the front side 107.

Figure 5:
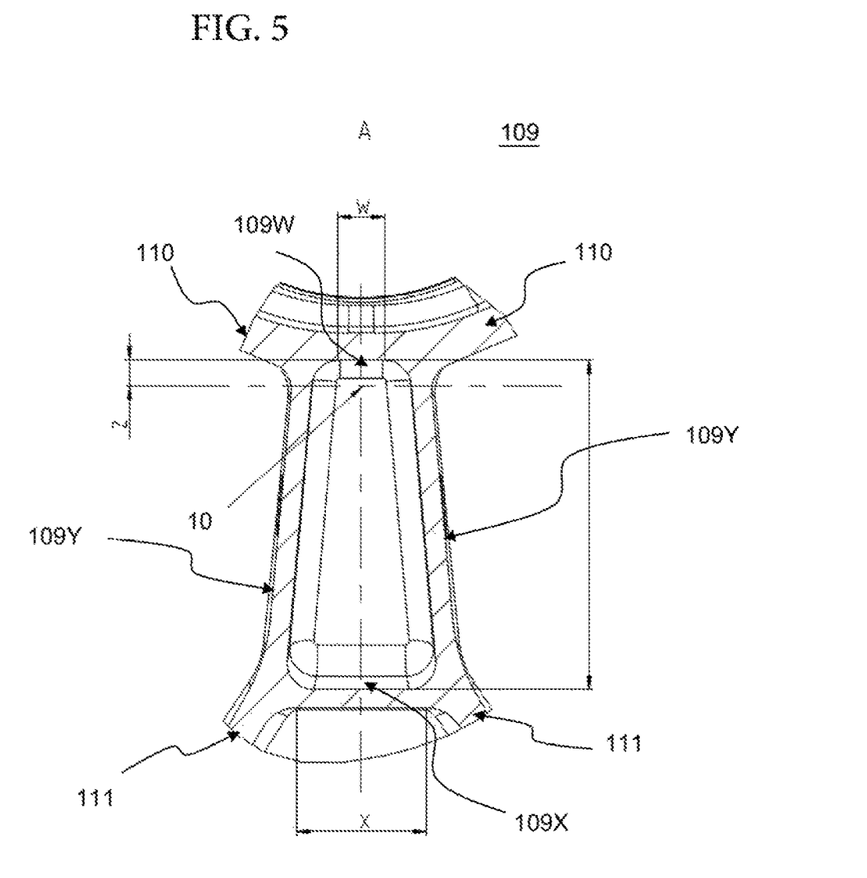
FIG. 5 shows a detail A from the center of the main frame.
Figure 7:
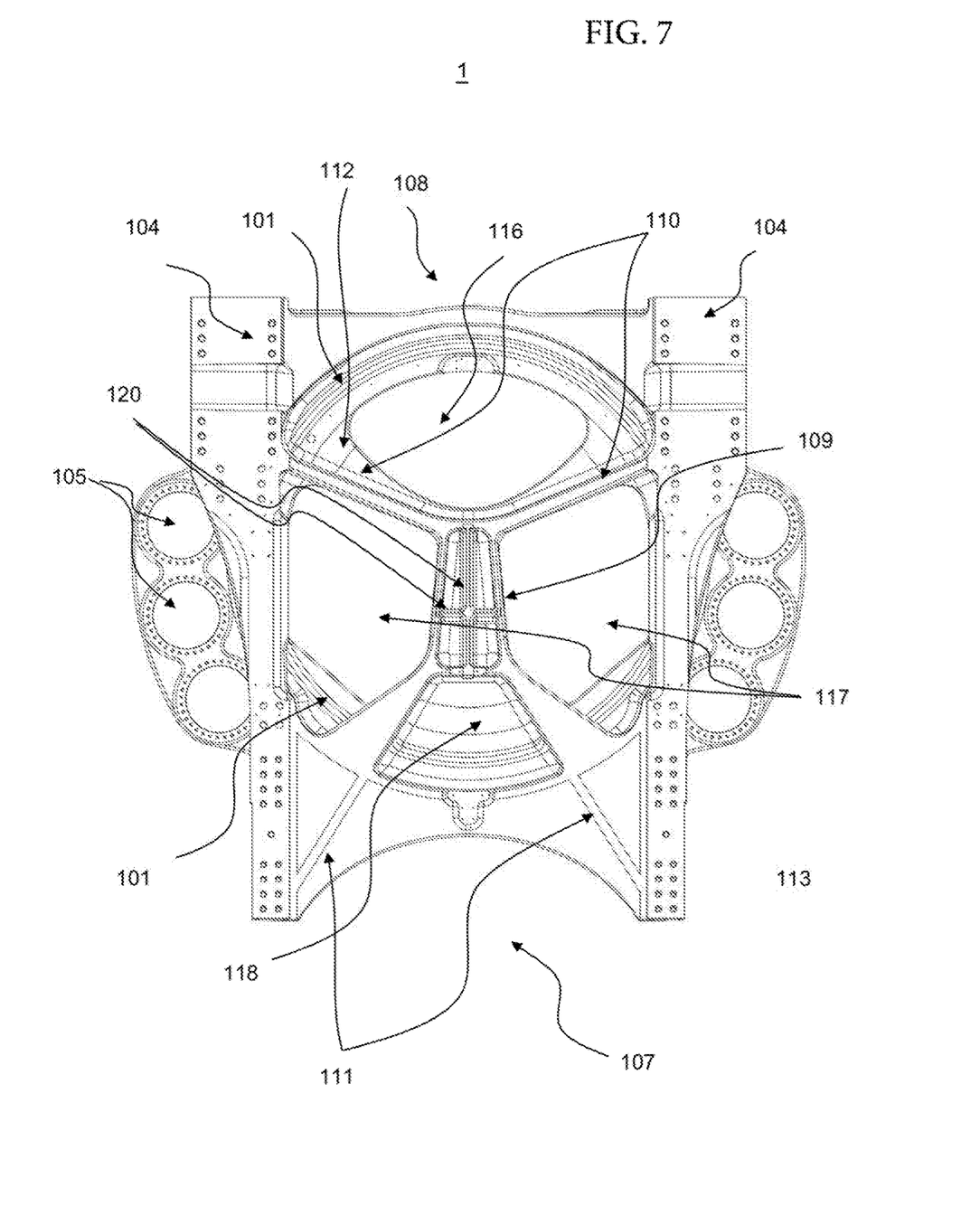

Represented in FIG. 5 is a detail A from the middle of the main frame 1, showing the box profile 109. The box profile 109 may be realized as a partly open or entirely closed construction. In the present embodiment, the box profile 109 is open towards the top side 102, and is trapezoidal, tapering towards the rear side 108. Here, the box profile 109 has a shorter basic side 109W that faces towards the rear side 108 of the main frame 1, a longer basic side 109X that faces towards the front side 107 of the main frame 1, and two limbs 109Y of equal length that connect the basic sides 109W and 109X to each other. In the present embodiment, the center 10 of the main frame 1 is located close to the shorter basic side 109W. The length (W, X, Y) of the basic sides 109W, 109X and of the limbs 109Y may vary according to the configuration of the main frame 1. The box profile 109 is adapted according to the loads to be carried and the necessary stiffness of the main frame 1. For structural or design reasons, the box profile 109 may also be of different shapes, for example a triangular, elliptical or round shape. The box profile 109 may also have further interior subdivisions 109Y between the limbs and the basic sides 109W, 109X, due to transversely and/or longitudinally extending walls 120. This is shown exemplarily in FIG. 7, in a further embodiment of the main frame 1. For example, the cavity of the box profile 109 may have a honeycomb structure.

Figure 6:
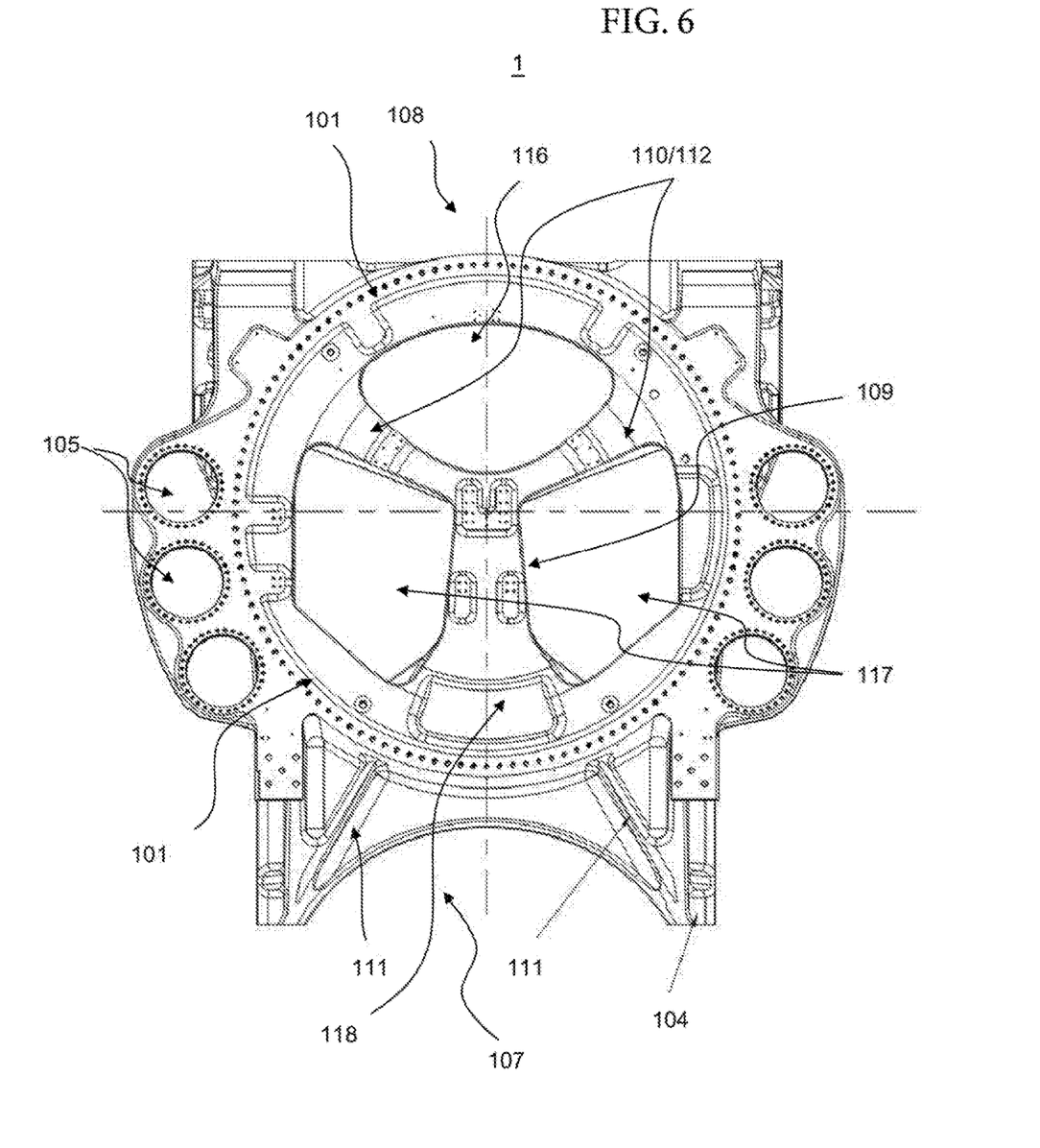
FIG. 6 shows a view, from below, of a main frame according to the invention; and, FIG. 7 shows a further embodiment of the main frame, in a top view.

FIG. 6 shows a view, from below, of the main frame 1 showing the circular, partly closed contour of the bottom side 103. Also shown, arranged on both sides, are the round openings 105 for the yaw drives. The box profile 109 is located in the center 10 of the main frame 1. The arms 110 end in the lateral portions 106 on the rear side 108. On the front side 107 of the main frame 1, the arms 111 are extended beyond the wall 101. Due to the box profile 109 and the arms 110 and 111, the bottom side 103 of the main frame 1 has at least three gaps 116, 117, at least two lateral gaps 117 being almost identical in size and in shape. The gap 116 faces towards the rear side 108 of the main frame 1, and is enclosed by the box profile 109, the two arms 110 and the wall 101. The two gaps 117, arranged laterally, are enclosed by the box profile 109, the two arms 110, the two arms 111 and the lateral portions 106 of the wall 101. There may be a fourth gap 118 located on the bottom side 103, towards the front side 107, between the box profile 109, the two arms 111 and the wall 101. If the angle U between the two arms 111 is small, and if there are collars, directed inwards, formed onto the two arms 111 on the bottom side, it may be the case that there is no gap 118. The size of the gaps is also not determined solely by the shape and the size of the collars 112, 113 on the arms 110, 111, but also by the requirements with respect to the operating and extreme loads and the stiffness for the given space conditions.

This entire structure of the main frame 1 may be produced via welding or casting. In the case of the casting method, the entire component part, with the described wall 101, the arms 110, 111, the box profile 109, the openings 105 for the yaw drives, and the flanges 104 may consist of one component part.

Since the main frame 1 for a wind turbine that has been described in detail above is an embodiment, it may in the normal manner be modified to a wide extent by persons skilled in the art, without departure from the scope of the disclosure. In particular, the specific configuration of the arms 110, 111 and of the box profile 109 may also be realized in a shape other than that described here. Likewise, for example, the gaps 116, 117, 118 on the bottom side 103 of the main frame 1 may also be configured in a different shape, if this is necessary for space reasons or design reasons. Further, the use of the indefinite article "a" or "an" does not preclude the possibility of the respective features being multiply present.

It is understood that the foregoing description is that of the preferred embodiments of the invention and that various changes and modifications may be made thereto without departing from the spirit and scope of the invention as defined in the appended claims.

LIST OF REFERENCE NUMERALS

Part of the Description

RW rotor shaft
RF rotor flange
V angle between the arms 110A, 110B
U angle between the arms 111A, 111B
W, X, Y length of the basic sides 109W, 109X and of the limbs 109Y of the box profile 109
1 main frame
10 center
101 wall
102 top side
103 bottom side
104 flanges
105 openings for the yaw drives
106 lateral portions
107 front side
108 rear side
109 box profile
109W, 109X basic sides
109Y limb
110 arms
111 arms
112 collar
113 collar
116 gap
117 gap
118 gap
119 curvature
120 Longitudinal walls

What is claimed is:

1. A main frame for a wind turbine comprising:
a main frame body having a top side, a bottom side, a front side and a rear side;
said main frame body including a circumferential annular wall between said bottom side and said top side;
said circumferential annular wall including two lateral portions extending between said front side of said main frame body and said rear side of said main frame body;
two lateral flanges on said top side of said main frame body;
a plurality of arms arranged inside said circumferential annular wall;

a box profile;

said plurality of arms being connected to said circumferential annular wall via said box profile;

said plurality of arms including at least four arms;

said at least four arms including two arms connected to said box profile and said circumferential annular wall as a first symmetrical pair at said rear side;

said two arms of said first symmetrical pair defining an angle V;

said at least four arms including a further two arms connected to said box profile and said circumferential annular wall as a second symmetrical pair at said front side of said main frame body; and, said two arms of said second symmetrical pair defining an angle U.

2. The main frame of claim 1, wherein:

said two arms of said second symmetrical pair end directly at said front side; or, said two arms of said second symmetrical pair extend beyond said circumferential annular wall and each end at corresponding ones of said two lateral flanges.

3. The main frame of claim 1, wherein said at least four arms each have a collar formed thereon inwardly, outwardly or on both sides, on said top side or said bottom side.

4. The main frame of claim 1, wherein said angle (V) between said two arms of said first symmetrical pair and said angle (U) between said two arms of said second symmetrical pair are determined in dependence on a length and a width of said main frame body.

5. The main frame of claim 1, wherein said box profile is arranged in a centered manner in relation to said main frame.

6. The main frame of claim 1, wherein:

said main frame body defines a center thereof; and, said box profile is arranged at said center.

7. The main frame of claim 1, wherein said box profile has a rectangular shape.

8. The main frame of claim 1, wherein said box profile has a trapezoidal shape tapering towards said rear side or towards said front side of said main frame body.

9. The main frame of claim 1, wherein:

said box profile has an open or closed construction and has two limbs of equal length;

said box profile has a first basic side and a second basic side;

said two limbs each have a first end facing said rear side of said main frame and a second end facing said front side of said main frame;

said first ends of said two limbs being connected to said first basic side and said second ends of said two limbs being connected to said second basic side; and, said two limbs, said first basic side and said second basic side each having a respective length adapted to the main frame with respect to load bearing and stiffness, width and length.

10. The main frame of claim 9, wherein said first basic side and said second basic side are equal in length.

11. The main frame of claim 9, wherein one of said first basic side and said second basic side is shorter than the other.

12. The main frame of claim 9, wherein:

said box profile includes at least one box profile wall extending at least one of transversely and longitudinally; and, said box profile has further interior sub-divisions between said two limbs and said first basic side and said second basic side, as a result of said at least one box profile wall.

13. The main frame of claim 1, wherein said bottom side of the main frame body has a circular, partly closed, contour that is curved spherically in a direction of said top side.

14. The main frame of claim 1, wherein said circumferential annular wall defines an elliptical cutout in said top side at said front side and at said rear side.

15. The main frame of claim 3, wherein said top side of said main frame body is provided with a concave curvature in a longitudinal direction, said concave curvature determining a configuration both of said box profile and of said at least four arms with said collars formed thereon.

16. The main frame of claim 1, wherein the main frame is made via at least one of welding and casting.

* * * * *